United States Patent
Helmut

(10) Patent No.: US 9,664,256 B2
(45) Date of Patent: May 30, 2017

(54) TRANSMISSION WHICH CAN BE SWITCHED BETWEEN AT LEAST THREE SWITCHING STAGES

(71) Applicant: Richter Helmut, Schönbrunn/Steigerwald (DE)

(72) Inventor: Richter Helmut, Schönbrunn/Steigerwald (DE)

(*) Notice: Subject to any disclaimer, the term of this patent is extended or adjusted under 35 U.S.C. 154(b) by 101 days.

(21) Appl. No.: 14/418,212

(22) PCT Filed: Jul. 31, 2013

(86) PCT No.: PCT/EP2013/066104
§ 371 (c)(1),
(2) Date: Jan. 29, 2015

(87) PCT Pub. No.: WO2014/020074
PCT Pub. Date: Feb. 6, 2014

(65) Prior Publication Data
US 2015/0204420 A1    Jul. 23, 2015

(30) Foreign Application Priority Data
Aug. 1, 2012  (DE) .................... 20 2012 007 342 U

(51) Int. Cl.
F16H 3/00 (2006.01)
F16H 3/42 (2006.01)
F16H 3/34 (2006.01)

(52) U.S. Cl.
CPC ............... *F16H 3/423* (2013.01); *F16H 3/34* (2013.01); *F16H 2200/0039* (2013.01); *Y10T 74/1957* (2015.01); *Y10T 74/1959* (2015.01)

(58) Field of Classification Search
CPC .... F16H 3/423; F16H 3/34; F16H 2200/0039; Y10T 74/1959; Y10T 74/1957
See application file for complete search history.

(56) References Cited

U.S. PATENT DOCUMENTS

2009/0056486 A1    3/2009  Mothaffar

FOREIGN PATENT DOCUMENTS

DE        197 26 695      1/1999
DE    20 2010 001 876    5/2010
(Continued)

OTHER PUBLICATIONS

International Preliminary Report on Patentability, dated Feb. 3, 2015, issued in related application PCT/EP2013/066104, 9 pages (German language).

*Primary Examiner* — Victor Macarthur
(74) *Attorney, Agent, or Firm* — Nash & Titus, LLC

(57) ABSTRACT

The invention relates to a transmission (2) which can be switched between at least three switching stages. A transmission in accordance with the invention has a frame (6) in which a first drive shaft (4) with a first gear (12) non-rotatably mounted thereon and a second drive shaft (20) with a second gear (24) non-rotatably mounted thereon, having longitudinal axes (8, 22) disposed in parallel with one another, are rotatably mounted, and the transmission has a switching device. The first gear (12) is in the shape of a truncated cone at least in regions, with a first end (14) and a second end (16) with different numbers of teeth, and has first main teeth (30) which extend completely from the first end (14) to the second end (16) of the first gear (12). The second gear (24) is in the shape of a truncated cone at least in regions, having a third end (26) and a fourth end (28) with different number of teeth, and has second main teeth (3) which extend completely from the third end (26) to the fourth end (28) of the second gear (24). The switching device is arranged to displace one either first gear (12) and the second gear (24) in parallel and relative to the respective other gear (12, 4) into a first, a second and a third switching position. In the first switching position the first end (14) of the first gear (12) is engaged with the fourth end (28) of the (Continued)

Figure 1A:
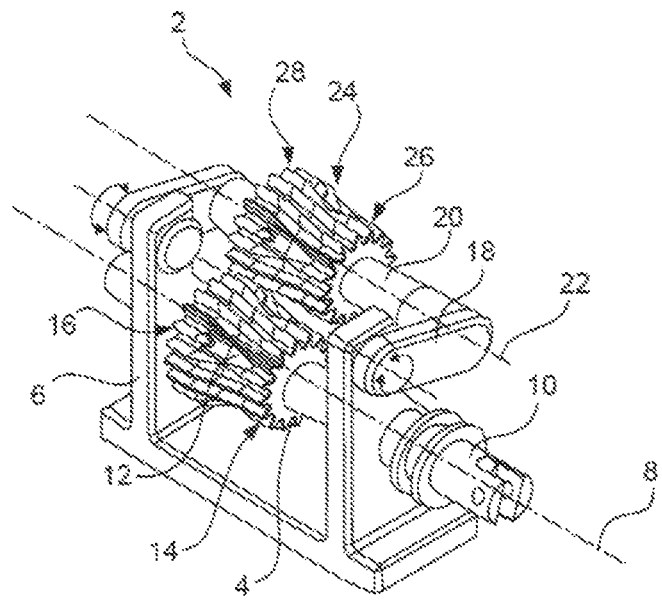

second gear (24), in the second switching position the second end (16) of the first gear (12) is engaged with the fourth end (28) of the second gear (24) and in the third switching position the second end (16) of the first gear (12) is engaged with the third end (26) of the second gear (24).

10 Claims, 3 Drawing Sheets

(56) References Cited

FOREIGN PATENT DOCUMENTS

| EP | 2531747 | 8/2011 |
|----|---------|--------|
| GB | 1 205 821 | 9/1970 |
| GB | 2095773 | 10/1982 |
| WO | WO 03/025426 | 3/2003 |
| WO | WO 2011/095348 | 8/2011 |

TRANSMISSION WHICH CAN BE SWITCHED BETWEEN AT LEAST THREE SWITCHING STAGES

TECHNICAL AREA

The invention relates to a transmission that can be switched between at least three switching stages.

BACKGROUND OF THE INVENTION

Transmissions are sufficiently known in the prior art for use in vehicles, tool machines and devices in many technical areas. Gear transmissions are especially widespread and will be examined in detail in the following in the course of the description of the invention.

Transmissions allow shifting by changing translation ratios between gears, which result in a changing of the speed and of the torque. In spur gear transmissions a drive shaft and a driven shaft are arranged parallel to one another. Relatively simple such transmissions for tool machines have at least one drive arrangement and a driven arrangement on which power gears in the form of spur gears can be arranged, wherein the drive arrangement and the driven arrangement can be shifted in such a manner relative to one another that at least two different pairings of power gears can be produced that deliver different translations as a function of the diameter ratio and therefore of the ratio of the number of teeth.

It is necessary in such simple transmissions to completely brake and stop a system comprising the transmission so that the translation ratio can be changed in the case of teeth moved relative to each other by a relative shifting of the drive arrangement and of the driven arrangement without damaging the power gears.

DE 20 2010 001 876 U1 discloses a transmission with a drive arrangement comprising a first power gear and a second power gear between which a first ratchet gear constructed as a bevel gear is arranged in a flush manner. A driven arrangement comprises a third power gear that can be brought into engagement with the first or the second power gear. A switching device moves the third power gear in such a manner that it is engaged with the first or the second power gear so that a switching occurs by moving the third power gear.

SUMMARY OF THE INVENTION

The stopping of a transmission for switching the speed of a driven arrangement is disadvantageous since the driven, inert masses coupled to the driven arrangement must be braked and accelerated again after the switching process. This means in the same way in particular in tool machines, for example, a turning machine or milling machine, a reduction of the effectiveness and therefore of the productivity and on the other hand an elevation of the specific cost of a product produced on the particular tool machine.

The using of a transmission with a bevel gear arranged between two power gears leads to a switching possibility only between two different speeds. For other switching possibilities additional bevel gears and power gears would be necessary.

Accordingly, it could be viewed as a problem for the invention to suggest a transmission that allows a switching between three or more speeds without requiring additional gears and without requiring the stopping of a transmission prior to switching procedures.

Another problem of the invention could be the suggesting of such a transmission that, in comparison to customary transmissions, is not complex or is only complex to a very slight extent.

The previously cited problems are solved by a transmission with the features of the independent protective claim 1. Advantageous further developments can be gathered from the subclaims.

A transmission in accordance with the invention comprises a frame in which a first working shaft with a first gear arranged on it in a rotation-proof manner and a second working shaft with a second gear arranged on it in a rotation-proof manner are rotatably supported with longitudinal axes arranged parallel to one another and comprises a switching device. The first gear is shaped like a truncated cone at least in areas with a first end and a second end with different numbers of teeth and comprises first main teeth that extend completely from the first end to the second end of the first gear. The second gear is shaped like a truncated cone at least in areas with a third end and a fourth end with different numbers of teeth and comprises second main teeth that extend completely from the third end to the fourth end of the second gear. The switching device is designed to shift at least one of the first gear and of the second gear in parallel to and relative to the particular other gear into a first, a second and a third switching position, wherein in the first switching position the first end of the first gear is engaged with the fourth end of the second gear, wherein in the second switching position the second end of the first gear is engaged with the fourth end of the second gear, and wherein in the third switching position the second end of the first gear is engaged with the third end of the second gear.

The frame of the transmission is to be considered as an apparatus that carries the components of the transmission and allows the installation in a vehicle or in a tool machine. Of course, the frame can also be an integral constituent of the higher-order system and does not have to be made separately available.

The first working shaft can be a drive shaft or a driven shaft. That means that a drive device can be arranged on the first working shaft. Likewise, however, it would also be possible that the first working shaft is connected to a component to be driven, for example, a wheel, a Cardan shaft, a propeller shaft or the like. The second working shaft is, in a corresponding manner, a driven shaft or a drive shaft that is driven by the intermeshing gears or the first working shaft.

The truncated cone shape made in at least one area has a first end and a second end. One of the first end and of the second end has a smaller diameter than the other end. The number of teeth present on the end with the smaller diameter is less than the number of teeth on the other end by a given modulus. The main teeth extend completely from the first end to the second end, whereby other teeth can be arranged on the end of the greater diameter that run into the tooth base or are interrupted. The shape of a truncated cone in areas does not exclude the fact that the first and second gear can be completely conical, and on the other hand it is also conceivable that the shape of a truncated cone can be extended on both ends by a cylindrical gear section whose diameter remains constant and connects flush with the end of the truncated cone shape arranged on it. The same applies to the shape of the second gear with a third end and a fourth end.

The switching device serves to carry out the actual switching procedure. To this end a relative shifting of the first and of the second gear to one another is carried out preferably along and in parallel to the longitudinal axes of the first working shaft and of the second working shaft. In this manner one of three different switching positions can be reached in accordance with the invention. In the first switching position the first end of the first gear, that has a somewhat smaller diameter then the second end of the first gear, engages with the fourth end of the second gear, that has, for example, a greater diameter than the third end of the second gear. If the first working shaft is constructed as a drive shaft, the highest possible translation can be realized as a result so that the first switching position represents a first gear of the transmission of the invention. In the second switching position the second end of the first gear forms an engagement with the fourth end of the second gear. The translation is somewhat smaller than in the first switching position on account of the larger diameter of the second end of the first gear and of the active diameter of the second gear that remains the same. Finally, in the third switching position the second end of the first gear forms an engagement with the third end of the second gear. As a result of the active diameter of the first gear that remained the same and of the active diameter of the second gear that became smaller, the translation ratio became even smaller so that the third switching position forms a third gear. If the first working shaft is a driven shaft, the sequence of the switching positions is exactly the inverse.

This construction has distinct advantages over conventional transmissions that are based on combinations of spur gears that must always be braked or synchronized and furthermore require a distinctly greater construction space. The use of gears constructed to have the shape of a truncated cone in sections can bring about a simplified switching in which the particular driving or driven gear slides along the main teeth of the particular other gear and reaches an end of this other gear that is toothed in a deviating manner. The rotation of the gears does not have to be interrupted here because the switching process has a constant gearing and therefore leads to a continuous further rotation of the gears. Accordingly, the construction space is distinctly more compact than with conventional transmissions.

In an advantageous embodiment the first end and the second end of the first gear and the third and fourth end of the second gear are constructed to be cylindrical in sections. As a result, areas on the gears are constructed in such a manner that a smooth engagement of the gears that is without friction for a fairly long time can take place. In the three switching positions only cylindrical sections engage in each other, wherein during the switching process the particular cylindrical section slides along the main teeth into the particular opposite cylindrical one, adapting the speed of rotation.

In an advantageous embodiment at least one of the first gear and of the second gear comprises at least one intermediate tooth that is arranged between two main teeth and has a tooth curve and a root line, wherein the tooth curve runs non-parallel to the root line at least in areas and approaches the root line. Accordingly, an intermediate tooth is a tooth that has its complete height only on one end of the particular gear. Since the gears are shaped like a truncated cone in areas and must have the same modulus for an even gearing quality, it is necessary that a few superfluous teeth disappear from the end with the greater diameter to the end with the smaller diameter. To this end a tooth curve approaches the at least one intermediate tooth of the root line.

In an advantageous embodiment the tooth curve and the root line intersect at one point. As a result, the height of the intermediate tooth is zero at at least one point, i.e., it runs in the base of the particular tooth. A free space results at this position that can avoid switching conflicts in that teeth of a gear can move in places without tooth contact when slipping in the teeth of the other gear in order to be able to compensate different tooth numbers.

In addition, at least one main tooth can be interrupted at least partially. This avoids switching conflicts and a relative movement from one end to another end of one of the two teeth is clearly simplified since a main tooth or an intermediate tooth is allowed to slip through given a changing number of teeth and a clamping is avoided.

Likewise, the second gear can have at least one intermediate tooth that is arranged between two main teeth, that does not extend completely from the third end to the fourth end and runs on a side opposite the third end into the base of the second gear.

In an advantageous embodiment not all main teeth of the first and/or of the second gear are constructed parallel to the longitudinal axis of the particular gear. As a result, main teeth of the first or second gear are arranged obliquely, which results in a higher transfer of force and a less noisy transmission. The oblique construction of the main teeth can be carried out in such a manner that two main teeth form a type of funnel in the radial direction. As a result, the free space between the main teeth continues to be enlarged and improved for the avoidance of switching conflicts.

In an advantageous embodiment the first gear has a lower number of teeth on the first end than on the second end. The engagement of the first end of the first gear with an end of the second gear always signifies a greater translation ratio than the engagement of the second end of the first gear with an end of the second gear.

In an advantageous embodiment the second gear has a lower number of teeth on the third end than on the fourth end. As a result, the previously described gearing with the dropping translation ratios from the first to the third switching position is realized.

It is especially advantageous if the sections of the first and of the second gear that are shaped like a truncated cone are aligned parallel to each other. The resulting surface shells of the gears allow a uniform gearing quality and service life.

In another advantageous embodiment a holding frame supported in such a manner that it can pivot to the longitudinal axis of the first working shaft is on the frame, on which holding frame the second working shaft is supported in such a manner that it can rotate about the longitudinal axis. As a result, a deviating radial interval is allowed between the first and the second gear so that the different switching positions can be started.

SHORT DESCRIPTION OF THE DRAWINGS

Other features, advantages and possibilities of use of the present invention result from the following description of the exemplary embodiment and the figures. All described and/or graphically represented features form the subject matter of the invention alone and in any combination even independently of their composition in the individual claims or their relationship to previous matter. Furthermore, in the figures the same reference numerals stand for identical or similar objects.

Figures 1B, 1C:
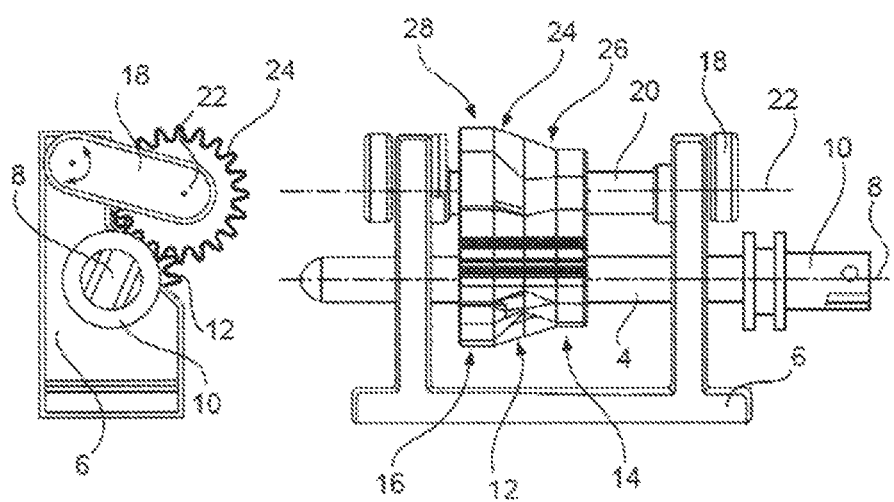

FIG. 1*a*, FIG. 1*b* and FIG. 1*c* show the transmission of the invention in two different lateral views (1*b* and 1*c*) and in an isometric view (1*a*), wherein the transmission of the invention is in a second switching position.

FIG. 2a, FIG. 2b, FIGS. 2c, 2d and 2e show by way of example a gear in a three-sided view (2a-2c) and in two isometric views.

DETAILED DESCRIPTION OF EXEMPLARY EMBODIMENTS

FIG. 1a shows a transmission 2 in accordance with the invention in an isometric view. The transmission 2 comprises a first working shaft 4 supported in a frame 6 in such a manner that it can rotate about a longitudinal axis 8. The first working shaft 4 is constructed by way of example as a drive shaft that can be connected to a flange 10 for the drive device, which flange is constructed as a fork. A first gear 12 is arranged on the first working shaft 4 in a rotation-proof manner by a shaft-hub connection, which gear is constructed in a central section in the shape of a truncated cone and comprises a first end 14 and a second end 16 that are both constructed in a cylindrical manner. The first end 14 has a lesser tooth number than the second end 16, whereby, however, the modulus is identical on both ends 14 and 16 in order to ensure the engaging of teeth with the same modulus on the first end 14 as well as on the second end 16.

A holding frame 18 is pivotably arranged on the frame 6 on which holding frame a second working shaft 20 is supported in such a manner that it can rotate about a longitudinal axis 22 and has the function of a driven shaft. A second gear 24 is supported in a rotation-proof manner on the second working shaft 20. The second gear 24 also has the shape of a truncated cone in a central section followed by a third end 26 and a fourth end 28 that are also designed to be cylindrical and which both have the same modulus as the first end 14 and the second end 16 of the first gear 12.

The transmission 2 in accordance with the invention can comprise three different translation ratios with this construction in that the first gear 12 and the second gear 24 are shifted relative to one another parallel to the longitudinal axes 8 and 22 so that the first end 14, the second end 16, the third end 26 and the fourth end 28 of the first gear 12 and of the second gear 24 can form different engagement pairs.

In a first switching position forming the highest translation ratio, for example, the first end 14 of the first gear 12 engages into the fourth end 28 of the second gear 24. As a result, provided that the first working shaft 4 is a drive shaft with a relatively small number of teeth, the second working shaft 20 is driven with a relatively large number of teeth. Solely by way of example, the first end 14 could have a total of 16 teeth while the second end 16 has a total of 20 teeth. The second gear 24 could be constructed for the sake of simplicity identically to the first gear 12 so that a translation ratio of 16:20 is adjusted in the first switching position.

In a second switching position the gears 12 and 24 are shifted in such a manner to one another that they precisely align with one another. The second end 16 of the first gear 12 engages at this time with the fourth end 28 of the second gear 24. This variant is explicitly shown in FIG. 1 and FIG. 1c. Accordingly, a translation ratio of 1:1 is reached in this switching position.

In another, third switching position in which the gears 12 and 24 are shifted in such a manner that the second end 16 of the first gear 12 engages with a third end 26 of the second gear 24, a translation ratio of 20:16 is formed.

Since the root line diameters different from each other in the different switching positions, a compensation movement of the holding frame 18 is necessary. This can be achieved by a sufficiently strong spring control or by a cam lever control so that it is always ensured that a correct engagement between the gears prevails without teeth flanks of the one gear making contact with the tooth base of the other gear.

The fact is especially advantageous in the shown transmission 2 that the small construction space and the requirement of only two gears are nevertheless sufficient for making possible three switching stages.

FIG. 1b makes it clear in a lateral view that the holding frame 18 is responsible for the correct engagement of the gear pair and compensates different, necessary intervals of the longitudinal axes 18 and 22 with one another.

FIG. 1c clearly demonstrates the parallelism of the longitudinal axes 8 and 22 of the first working shaft 4 and the second working shaft 20 and the exact relative positioning of the two gears 12 and 24 in the second switching position. In order to be able to reach the first switching position, assuming that the first working shaft 4 is a drive shaft, the first gear is to be shifted to the left or the second gear 24 to the right so that the first end 14 of the first gear 12 can engage with the fourth end 28 of the second gear 24. Consequently, in order to reach the third switching position the first gear 12 would have to be shifted to the right or the second gear 24 to the left so that the second end 16 of the first gear 12 engages with the third end 26 of the second gear 24.

It is understandable that a switching device (not shown here) is arranged to perform the relative movement of the gears 12 and 24 to one another, for example, by a cam lever, a pneumatic or hydraulic actuator, a control transmission with an electric drive or the like. Furthermore, it is conceivable that a movement of the first gear 12 and also of the second gear 24 can take place.

Figure 2A:
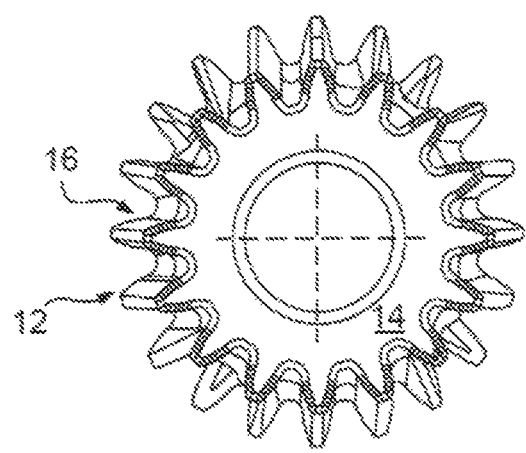
Figure 2B:
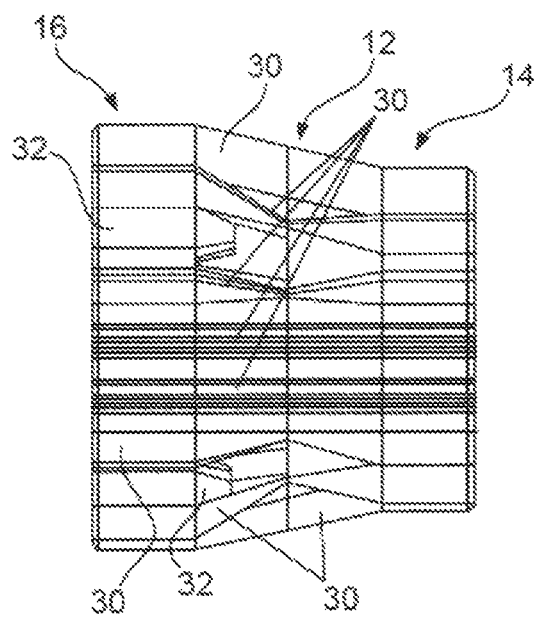
Figure 2C:
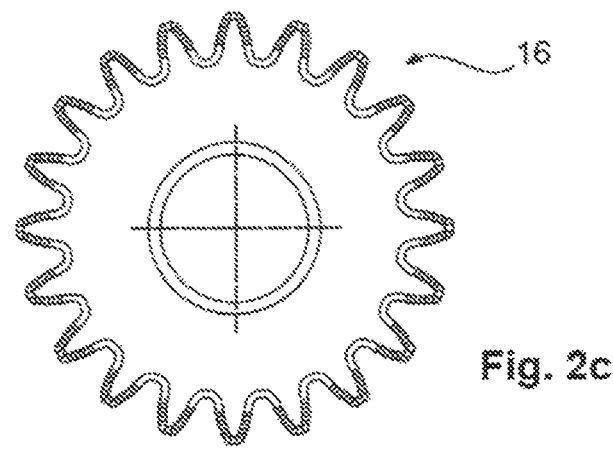
Figure 2D:
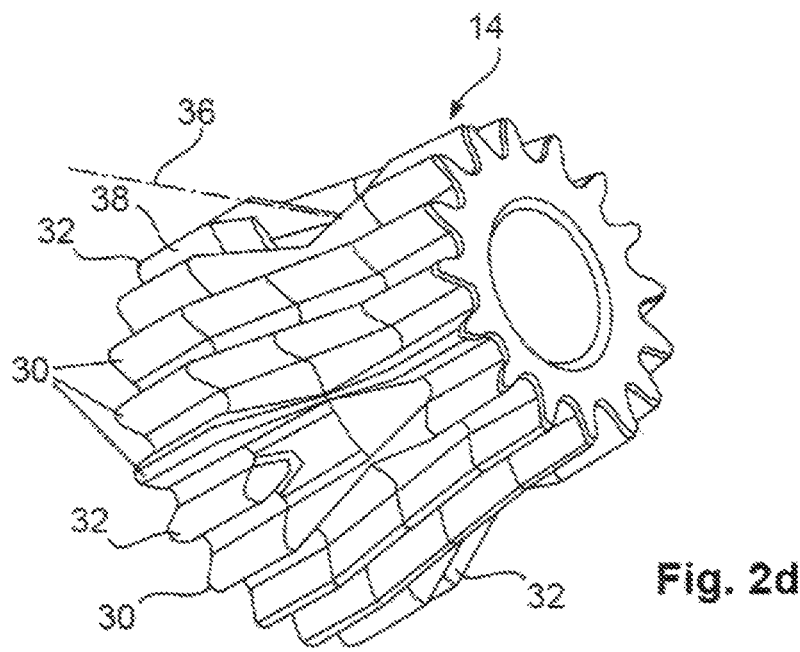
Figure 2E:
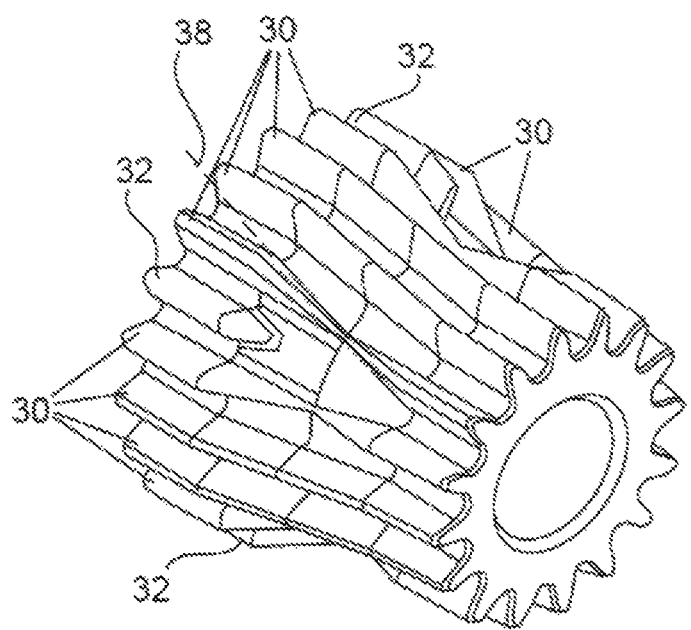

FIGS. 2a, 2b and 2c show by way of example a first gear 12 in a three-sided view. FIG. 2a shows a top view onto the first end 14 and shows that the second end 16 arranged behind it comprises four more teeth. This difference can be achieved in that the first gear 12 has main teeth 30 between which intermediate teeth 32 are arranged. The latter are preferably distributed symmetrically over the entire circumference and terminate in the truncated cone area of the first gear 12, that is located between the first end 14 and the second end 16. This creates free spaces 34 for tooth compensation.

In addition, a gentle sliding in of the teeth of the particular other gear onto the main teeth or intermediate teeth 30 or 32 can be allowed by area-wise interruptions of the directly adjacent main teeth 13 of the free spaces 34. This also allows rapid movements of the teeth 12 and 24 along the longitudinal axes 8 and 22 of the working shafts 4 and 20.

The interruptions of the main teeth can be achieved by moving tooth curves 36 onto root lines 38 of the particular main teeth 30. This can take place from the first end 14 to the second end 16 and inversely.

LIST OF REFERENCE NUMERALS 2 transmission
4 first working shaft
6 frame
8 longitudinal axis
10 flange
12 first gear
14 first end
16 second end
18 holding frame
20 second working shaft
22 longitudinal axis
24 second gear
26 third end 28 fourth end
30 main tooth
32 intermediate tooth
34 intermediate space
36 tooth curve
38 root line

The invention claimed is:

1. A transmission comprising
a frame comprising a first working shaft with a first gear arranged thereon in a rotation-proof arrangement and a second working shaft with a second gear arranged thereon in a rotation-proof arrangement, wherein the first working shaft and the second working shaft are rotatably supported on the frame with longitudinal axes arranged parallel to one another, and
a switching device,
wherein the first gear in at least one area is a truncated cone shape having a first end and a second end, wherein the diameter of the second end is greater than the diameter of the first end, wherein a first arrangement of main teeth extends from the first end to the second end, wherein within the first arrangement of main teeth at least one main tooth comprises a base and is at least partially interrupted by tapering of the main tooth toward the base from the first end or the second end or both,
and wherein the first arrangement of main teeth further comprises at least one area of free space positioned between two main teeth, so as to permit teeth of the second gear to move within the free space without contacting main teeth of the first gear, and thereby avoid switching conflicts during rotation of the first and second working shafts,
and wherein within the first arrangement of main teeth additional teeth are arranged on the second end,
wherein the second gear in at least one area is a truncated cone shape having a third end and a fourth end, wherein the diameter of the fourth end is greater than the diameter of the third end, wherein a second arrangement of main teeth extend from the third end to the fourth end, wherein within the second arrangement of main teeth at least one main tooth comprises a base and is at least partially interrupted by tapering of the main tooth toward the base from the third end or the fourth end or both,
and wherein the second arrangement of main teeth further comprises at least one area of free space positioned between two main teeth, so as to permit teeth of the first gear to move within the free space without contacting main teeth of the second gear, and thereby avoid switching conflicts during rotation of the first and second working shafts,
and wherein within the second arrangement of main teeth additional teeth are arranged on the fourth end,
wherein the switching device is designed to shift at least one of the first gear or the second gear in parallel to and relative to the other gear into a first, a second and a third switching position, wherein in the first switching position the first end of the first gear is engaged with the fourth end of the second gear, wherein in the second switching position the second end of the first gear is engaged with the fourth end of the second gear, and wherein in the third switching position the second end of the first gear is engaged with the third end of the second gear.

2. The transmission according to claim 1, wherein the first end and the second end of the first gear and the third end and the fourth end of the second gear are at least partially cylindrical in shape.

3. The transmission according to claim 1, wherein the first arrangement of main teeth or the second arrangement of main teeth, or both, further comprises at least one intermediate tooth that is arranged between two main teeth, wherein the at least one intermediate tooth has a tooth curve and a root line, wherein the tooth curve runs non-parallel to the root line at least in areas and approaches the root line.

4. The transmission according to claim 3, wherein the tooth curve and the root line intersect at one point.

5. The transmission according to claim 1, wherein the first gear has at least one intermediate tooth that is arranged between two main teeth, and that does not extend completely from the first end to the second end of the first gear, and that runs on a side opposite the first end of the first gear.

6. The transmission according to claim 1, wherein the second gear has at least one intermediate tooth that is arranged between two main teeth, that does not extend completely from the third end to the fourth end of the second gear, and that runs on a side opposite the third end of the second gear.

7. The transmission according to claim 1, wherein the first gear has a greater number of teeth on the first end than on the second end.

8. The transmission according to claim 1, wherein the second gear has a greater number of teeth on the third end than on the fourth end.

9. The transmission according to claim 1, wherein the truncated cones of the first gear and the second gear taper so as to be aligned parallel to each other.

10. The transmission according to claim 1, which further comprises a holding frame pivotably arranged on the frame,
wherein the holding frame supports the first working shaft so that the first working shaft can rotate about its longitudinal axis,
and wherein the holding frame supports the second working shaft so that the second working shaft can rotate about its longitudinal axis.

* * * * *